United States Patent
Winkler et al.

(10) Patent No.: US 8,439,589 B2
(45) Date of Patent: May 14, 2013

(54) DEVICE FOR ROTATABLY BEARING AN AIRCRAFT INTERIOR FITTING COMPONENT

(75) Inventors: Johannnes Winkler, Ulm (DE); Andreas Becker, Blaustein (DE); Christian Wolf, Neu-Ulm (DE)

(73) Assignee: Airbus Operations GmbH, Hamburg (DE)

(*) Notice: Subject to any disclaimer, the term of this patent is extended or adjusted under 35 U.S.C. 154(b) by 965 days.

(21) Appl. No.: 12/507,249

(22) Filed: Jul. 22, 2009

(65) Prior Publication Data

US 2010/0021096 A1 Jan. 28, 2010

Related U.S. Application Data

(60) Provisional application No. 61/083,582, filed on Jul. 25, 2008.

(30) Foreign Application Priority Data

Jul. 25, 2008 (DE) .......................... 10 2008 034 779

(51) Int. Cl.
*F16C 11/00* (2006.01)

(52) U.S. Cl.
USPC .......................................................... 403/119

(58) Field of Classification Search .................. 384/129, 384/226, 227, 247, 252; 403/21, 111, 119; 411/372.5, 372.6, 373
See application file for complete search history.

(56) References Cited

U.S. PATENT DOCUMENTS

| | | | | |
|---|---|---|---|---|
| 2,907,418 A | * | 10/1959 | Hudson et al. | 403/21 |
| 3,906,552 A | * | 9/1975 | Weber | 623/47 |
| 4,368,937 A | | 1/1983 | Palombo et al. | |
| 5,827,029 A | * | 10/1998 | Denman | 411/373 |
| 2008/0112754 A1 | | 5/2008 | Schmitz et al. | |

FOREIGN PATENT DOCUMENTS

DE 19728136 C1 4/1999

* cited by examiner

*Primary Examiner* — Phillip A Johnson
(74) *Attorney, Agent, or Firm* — Wood, Herron & Evans, LLP (57) ABSTRACT

A device for rotatably bearing an aircraft interior fitting component, in particular a lowerable shell of a luggage rack includes a bearing bush as well as a bearing bolt which is adapted to be rotatably accommodated in the bearing bush. The bearing bolt is disposed in a bearing bolt guide such that it is movable between a first and a second position and retainable in at least one position in the bearing bolt guide by a retaining device.

16 Claims, 4 Drawing Sheets

DEVICE FOR ROTATABLY BEARING AN AIRCRAFT INTERIOR FITTING COMPONENT

CROSS-REFERENCE TO RELATED APPLICATIONS

This application claims priority to U.S. Provisional Patent Application No. 61/083,582, filed on Jul. 25, 2008; and/or German Patent Application No. 10 2008 034 779.5 filed on Jul. 25, 2008.

TECHNICAL FIELD

The invention relates to a device for rotatably bearing an aircraft interior fitting component, in particular a lowerable shell of a luggage rack, as well as to a luggage rack equipped with a bearing device of this kind. The invention also relates to a method for mounting an aircraft interior fitting component, in particular a lowerable shell of a luggage rack, in an aircraft.

BACKGROUND

Luggage racks with a lowerable shell are at present used in particular in passenger aircraft, as they advantageously permit optimal utilization of space and at the same time a high level of operating convenience. The lowerable shell is pivotable from an upper closed position, in which optimal headroom for the passengers seated under the luggage racks is guaranteed, into a lower open loading and unloading position. Even relatively small people can easily deposit items of luggage in the shell and remove them from the shell in the loading and unloading position.

In the case of luggage racks which are currently used in passenger aircraft the lowerable shell is borne so as to be pivotable relative to a luggage rack housing in the region of two side walls lying opposite one another. A bearing device for mounting the lowerable shell in the luggage rack housing comprises a bearing bush which is formed in one piece with a base plate. The base plate of the bearing bush is fastened to an inner surface of a side wall of the luggage rack housing which faces the lowerable shell by means of three screws. A bearing bolt, which is intended to be accommodated in the bearing bush, extends through an opening which is formed in a side wall of the lowerable shell. A base plate, which is formed in one piece with the bearing bolt, is fastened to an inner surface of the side wall of the lowerable shell which is remote from the luggage rack housing by means of three screws, similarly to the base plate formed in one piece with the bearing bush. In order to ensure that the interior of the lowerable shell is visually attractive, the bearing bolt base plate is covered by means of a correspondingly shaped cover plate.

The bearing bush must firstly be screwed to the side wall of the luggage rack housing when the lowerable shell is mounted in the luggage rack housing. In the next step the lowerable shell must be raised into the desired position and the bearing bolt introduced into the bearing bush through the opening which is formed in the side wall of the lowerable shell. It is then necessary to screw home the three screws for fastening the bearing bolt base plate to the side wall of the lowerable shell. Finally, the cover plate for covering the bearing bolt base plate must also be fitted. Dismounting of the lowerable shell requires the same steps in the reverse direction. Both mounting and dismounting of the lowerable luggage rack shell are consequently relatively complicated and are carried out using many loose individual parts. Furthermore, a relatively large cover plate is required to cover the bearing bolt base plate disposed in the interior of the lowerable shell.

The object of the invention is to provide a device for rotatably bearing an aircraft interior fitting component, in particular a lowerable shell of a luggage rack, which enables the aircraft interior fitting component to be quickly and easily mounted in an aircraft The invention is also directed towards the object of providing a luggage rack equipped with a bearing device of this kind as well as a method for mounting an aircraft interior fitting component, in particular a lowerable shell of a luggage rack, in an aircraft which can be carried out quickly and easily.

SUMMARY OF THE INVENTION

This object is achieved by a device for rotatably bearing an aircraft interior fitting component which has the features described below, a luggage rack which has the features described below and a method for mounting an aircraft interior fitting component in an aircraft which has the features described below.

A device according to the invention for rotatably bearing an aircraft interior fitting component on a bearing component comprises a bearing bush as well as a bearing bolt which is adapted to be rotatably accommodated in the bearing bush. The bearing bolt is disposed in a bearing bolt guide such that it is movable along a longitudinal axis of the bearing bolt guide between a first and a second position. The bearing bush of the bearing device according to the invention can be fastened to the bearing component or the aircraft interior fitting component to be rotatably borne on the bearing component. The bearing bolt guide can be fastened to the aircraft interior fitting component to be rotatably borne or the bearing component in a similar manner. The bearing device according to the invention also comprises a retaining device which is adapted to retain the bearing bolt in at least one position in the bearing bolt guide. The retaining device is preferably configured so that it enables the bearing bolt to be retained in its second position, in which the bearing bolt can be accommodated in the bearing bush if the bearing bolt guide and the bearing bush are appropriately oriented.

When mounting the aircraft interior fitting component to be rotatably borne using the bearing device according to the invention, the bearing bush and the bearing bolt guide can be fastened to the bearing component or the aircraft interior fitting component even before the aircraft interior fitting component is positioned relative to the bearing component. During mounting of the aircraft interior fitting component it is then simply necessary to move the bearing bolt in the bearing bolt guide into its first position, in which it does not obstruct the positioning of the aircraft interior fitting component relative to the bearing component. On the other hand, when the aircraft interior fitting component is disposed in the desired position relative to the bearing component, the bearing bolt can be moved in the bearing bolt guide into its second position, in which it can be brought into engagement with the bearing bush if the bearing bolt guide and the bearing bush are appropriately oriented.

The bearing device according to the invention therefore enables the mounting of the aircraft interior fitting component to be considerably simplified, which results in an advantageous reduction of the mounting time. Furthermore, it is no longer necessary to handle a large number of loose individual components when mounting the aircraft interior fitting component. It is also possible to dispense with the use of special tools when mounting the aircraft interior fitting component. When the bearing bolt, for example in its second position, is retained in the bearing bolt guide and accommodated in the bearing bush, the forces which arise during operation of the rotatably borne aircraft interior fitting component can be introduced into the bearing component via the bearing bolt and the bearing bush without any problems. The bearing device according to the invention therefore guarantees sound operation of the aircraft interior fitting component to be rotatably borne and is in particular suitable for mounting a lowerable luggage rack shell in a luggage rack housing.

The bearing bush of the bearing device according to the invention can be connected to a base plate for fastening the bearing bush to the bearing component or the aircraft interior fitting component. The bearing bush can be formed in one piece with the base plate. However, as an alternative to this, the bearing bush can also be connected to the base plate in a detachable manner. The base plate can be provided with at least one bore, which enables the base plate to be screwed, riveted or fastened in another way to the bearing component or the aircraft interior fitting component. The base plate is preferably provided with three bores for accommodating three screws. The bearing bush is preferably intended to be fastened to the bearing component. If the aircraft interior fitting component to be rotatably borne is a lowerable luggage rack shell, the bearing bush base plate can be fastened, for example, to an inner surface of a side wall of a luggage rack housing which faces a lowerable shell of the luggage rack when the luggage rack is in the finally assembled state.

The bearing bush of the bearing device according to the invention is preferably substantially of hollow cylindrical formation. In order to enable the bearing bolt to be borne in the bearing bush in a sliding manner, the bearing bush preferably comprises a sliding bearing device which can be pressed into the bearing bush. If the bearing bush is substantially of hollow cylindrical formation, the sliding bearing device can be in the form of a sliding bearing ring, for example, which is pressed into the bearing bush such that it at least partly covers an inner surface of the sliding bearing bush.

Similarly to the bearing bush, the bolt guide can also be connected to a base plate for fastening the bolt guide to the aircraft interior fitting component or the bearing component. The base plate can be formed in one piece with the bolt guide or fastened to the bolt guide in a detachable manner. Similarly to the bearing bush base plate, the bolt guide base plate can also be provided with corresponding bores for accommodating screws, rivets or other fastening devices for fastening the bolt guide base plate to the aircraft interior fitting component or the bearing component. The bolt guide base plate preferably has three bores through which corresponding screws can be passed in order to screw the bolt guide base plate to the aircraft interior fitting component or the bearing component. The bolt guide is preferably intended to be fastened to the aircraft interior fitting component. If the aircraft interior fitting component to be rotatably borne is a lowerable luggage rack shell, the base plate of the bolt guide can be screwed to an outer surface of the side wall of the lowerable luggage rack shell which faces the luggage rack housing when the luggage rack is in the finally assembled state.

If the bearing device according to the invention is used to mount a lowerable shell of a luggage rack on a luggage rack housing, it is consequently no longer necessary to fasten the bearing bolt to an inner surface of the side wall of the luggage rack shell by means of a corresponding base plate. The bearing bush base plate can instead be mounted on the outer surface of the side wall of the lowerable luggage rack shell. The side wall of the lowerable luggage rack shell can be provided with an opening through which the bearing bolt can project at least partly into the interior of the luggage rack shell when it is located in its first position. Therefore, when using the bearing device according to the invention for mounting a lowerable shell in a luggage rack housing, it is possible to dispense with a large-area cover plate, as is required in the case of a bearing device known from the prior art for covering a bearing bolt base plate which is fastened to an inner surface of the side wall of the lowerable shell.

The retaining device of the bearing device according to the invention can be adapted to retain the bearing bolt in more than one position in the bearing bolt guide. For example, the retaining device can enable the bearing bolt to be retained in its first and its second position in the bearing bolt guide. The retaining device preferably comprises a retaining pin which interacts with a receptacle formed in the bearing bolt in order to retain the bearing bolt in a position in the bearing bolt guide. The receptacle which is intended to interact with the retaining pin is preferably formed in a circumferential surface of the bearing bolt. When the retaining pin is accommodated in the recess formed in the circumferential surface of the bearing bolt, the bearing bolt is securely held in its position in the bearing bolt guide. If it is desirable or necessary to retain the bearing bolt in a plurality of positions in the bearing bolt guide, a plurality of receptacles, which can interact with the retaining pin of the retaining device if required, are formed in the bearing bolt.

The bearing device according to the invention preferably also comprises an anti-loss mechanism which is adapted to hold the bearing bolt secure against loss in the bearing bolt guide. The anti-loss mechanism ensures that the bearing bolt does not fall out of the bearing bolt guide during or following the movement of the bearing bolt in the bearing bolt guide when the aircraft interior fitting component is mounted on the bearing component. A bearing device which is equipped with an anti-loss mechanism thus enables the aircraft interior fitting component to be mounted on the bearing component in a particularly simple and convenient manner.

The anti-loss mechanism can comprise a slotted guide which is formed in the circumferential surface of the bearing bolt as well as a pin which is guided in the slotted guide. The pin which is guided in the slotted guide can be the retaining pin of the retaining device. However the anti-loss mechanism can alternatively also be provided with a separate pin. The slotted guide preferably extends at an angle to a front face of the bearing bolt over the circumferential surface of the bearing bolt such that the movement of the bearing bolt between its first and its second position along the longitudinal axis of the bearing bolt guide can be brought about by a rotation of the bearing bolt relative to the bearing bolt guide.

The bearing bolt of the bearing device according to the invention can also comprise a spring pressure piece having a portion which extends from a front face of the bearing bolt. When the bearing bolt is accommodated in the bearing bush, the portion of the spring pressure piece which extends from the front face of the bearing bolt interacts with an inner surface of the bearing bush which lies opposite the front face of the bearing bolt. The inner surface of the bearing bush which lies opposite the front face of the bearing bolt can be formed by the base plate which is connected to the bearing bush. The spring pressure piece can be screwed into a bore which is formed in the front face of the bearing bolt. The spring pressure piece serves to secure the bearing bolt in the bearing bush and in addition provides the possibility of finely adjusting the position of the aircraft interior fitting component at the bearing component.

The bearing bolt is preferably of hollow cylindrical formation. The spring pressure piece which is screwed into the front face of the bearing bolt is then itself still accessible when the bearing bolt is already accommodated in the bearing bush. If the bearing device according to the invention is used to mount a lowerable shell in a luggage rack housing, the lowerable shell can consequently firstly be secured in its position in the luggage rack housing by bringing the bearing bolt into engagement with the bearing bush. Fine adjustment of the lowerable shell in the luggage rack housing can then take place by adjusting the spring pressure piece accordingly, the spring pressure piece being accessible from the interior of the lowerable shell through the opening which is formed in the side wall of the luggage rack housing and the hollow cylindrical bearing bolt.

The bearing device according to the invention preferably also comprises a cover cap which is intended to be fastened to the bearing bolt guide. If the bearing device according to the invention is used to mount a lowerable shell in a luggage rack housing, the cover cap can be applied to a part of the bearing bolt guide which projects through the opening which is formed in the side wall of the lowerable shell into the interior of the lowerable shell. However a cover cap intended for covering the bearing bolt guide of the bearing device according to the invention is distinctly smaller than a cover plate which is used in the case of a bearing device known from the prior art for covering a bearing bolt base plate. Therefore the bearing device according to the invention also enables the interior of the lowerable luggage rack shell to be configured so as to be particularly visually attractive. The cover cap preferably comprises a locking device which is adapted to interact with a complementary locking device provided at the bearing bolt guide. This enables the cover cap to be easily mounted on the bearing bolt guide.

A luggage rack according to the invention comprises a lowerable shell which is rotatably borne on a luggage rack housing by means of a bearing device as described above. In the case of the luggage rack according to the invention the bearing bush is preferably fastened to an inner surface of a luggage rack housing side wall which faces the lowerable shell when the luggage rack is in the finally assembled state. On the other hand, the bearing bolt guide is preferably fitted to an outer surface of a side wall of the lowerable shell which faces the luggage rack housing side wall when the luggage rack is in the finally assembled state. An opening is preferably formed in the side wall of the lowerable shell of the luggage rack, through which opening the bearing bolt can be moved into its first position, in which it does not obstruct the positioning of the lowerable shell in the luggage rack housing, when the lowerable shell is mounted in the luggage rack housing. A portion of the bearing bolt can also pass through the opening which is formed in the side wall of the lowerable shell, whereby the bearing bolt guide can be fastened to the side wall of the lowerable shell in a particularly stable manner. A cover cap can be applied to the portion of the bearing bolt guide which projects into the interior of the lowerable shell in order to ensure that the interior of the lowerable shell is visually attractive.

In a method according to the invention for mounting an aircraft interior fitting component in an aircraft a bearing bush is firstly fastened to a bearing component or the aircraft interior fitting component. A bearing bolt guide is then fastened to the aircraft interior fitting component or the bearing component, with a bearing bolt, which is adapted to be accommodated in the bearing bush, being disposed in the bearing bolt guide such that it is movable along a longitudinal axis of the bearing bolt guide between a first and a second position. The bearing bolt is moved in the bearing bolt guide in a first direction along the longitudinal axis of the bearing bolt guide into its first position. As long as the bearing bolt is located in its first position, the aircraft interior fitting component is positioned, i.e. disposed relative to the bearing component, as the bearing bolt does not obstruct the positioning of the aircraft interior fitting component in its first position. The bearing bolt is then moved in the bearing bolt guide in a direction which is opposite to the first direction along the longitudinal axis of the bearing bolt guide into its second position. Once the bearing bolt has reached its second position in the bearing bolt guide, the bearing bolt is accommodated in the bearing bush. Finally, the bearing bolt is retained in its position in the bearing bolt guide in order to enable the aircraft interior fitting component to be rotatably borne on the bearing component in the proper manner. The method according to the invention can be used in a particularly advantageous manner to quickly and easily mount a lowerable shell in a luggage rack compartment.

The bearing bolt is preferably retained in its second and/or its first position in the mounting method according to the invention. By retaining the bearing bolt in its first position, it becomes easier to position the aircraft interior fitting component relative to the bearing component, as it is not necessary to manually hold the bearing bolt in its first position.

The movement of the bearing bolt between its first and its second position is preferably guided by the interaction of a slotted guide made in a circumferential surface of the bearing bolt with a pin which is guided in the slotted guide. The pin which is guided in the slotted guide can also be used to retain the bearing bolt in its first and its second position when (a) corresponding recess(es) for accommodating the pin is/are provided in the circumferential surface of the bearing bolt. The slotted guide is preferably configured so that the movement of the bearing bolt along the longitudinal axis of the bearing bolt guide is brought about by rotating the bearing bolt relative to the bearing bolt guide. This makes it possible to move the bearing bolt between its first and its second position along the longitudinal axis of the bearing bolt guide in a reliable and controllable manner.

Fine adjustment of the bearing arrangement of the aircraft interior fitting component at the bearing component preferably takes place by adjusting a spring pressure piece having a portion which extends from a front face of the bearing bolt.

Finally, a locking device which is provided at a cover cap can be interlocked with a complementary locking device which is provided at the bearing bolt guide in order to fasten the cover cap to the bearing bolt guide.

BRIEF DESCRIPTION OF THE DRAWINGS

A preferred embodiment of the present invention is now described in detail on the basis of the accompanying schematic figures, of which.

DETAILED DESCRIPTION

A bearing device 10 which is shown in FIGS. 1 to 5 is intended to be rotatably fastened to a bearing component. For example, the bearing device 10 can be used for rotatably bearing a lowerable shell of a luggage rack on a luggage rack housing. However it is understood that the bearing device 10 is also suitable for rotatably fastening other aircraft interior fitting components to corresponding bearing components.

The bearing device 10 comprises a bearing bush 12 of hollow cylindrical formation which is formed in one piece with a base plate 14 which is fitted to a front side of the bearing bush 12. The base plate 14 is provided with three bores 16 through which screws can be passed in order to fasten the base plate 14 and the bearing bush 12 to a bearing component. As can be seen in particular in FIGS. 4 and 5, the bearing bush 12 is intended to be fastened by means of the base plate 14 to an outer surface of a side wall 18 of a luggage rack housing which faces a lowerable shell accommodated in the luggage rack housing when the luggage rack is in the finally assembled state. A sliding bearing device 20 of annular formation is pressed into the bearing bush 12.

Figure 1:
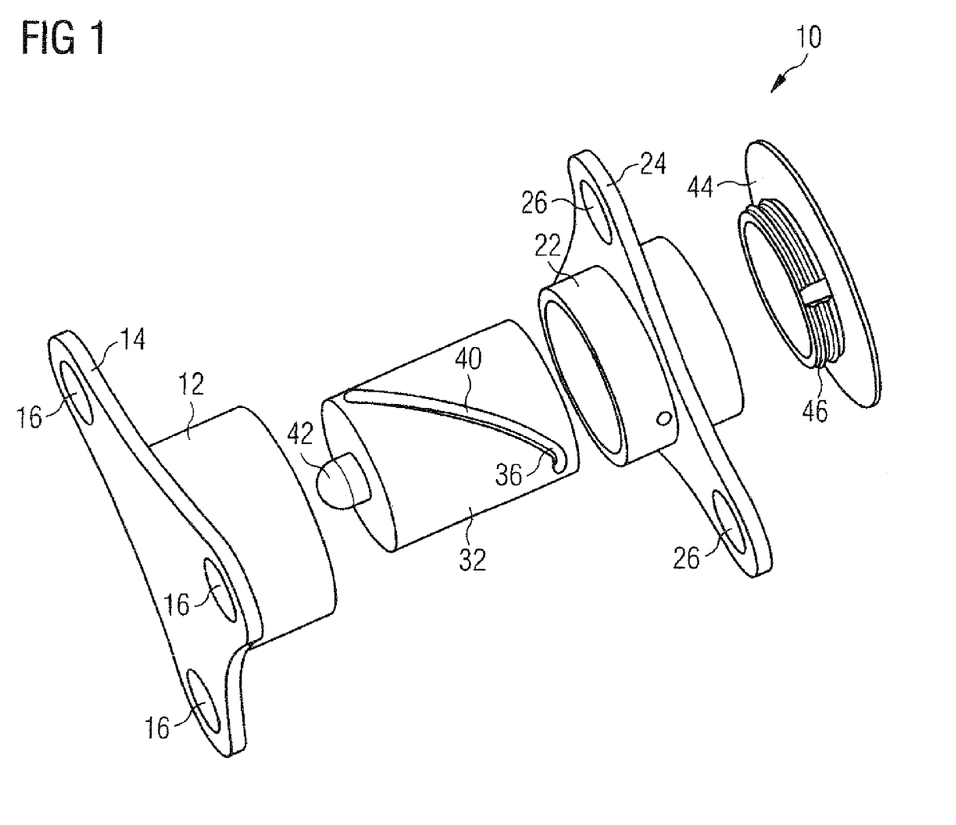
FIG. 1 shows a three-dimensional exploded representation of a device for rotatably bearing an aircraft interior fitting component on a bearing component.
Figure 2:
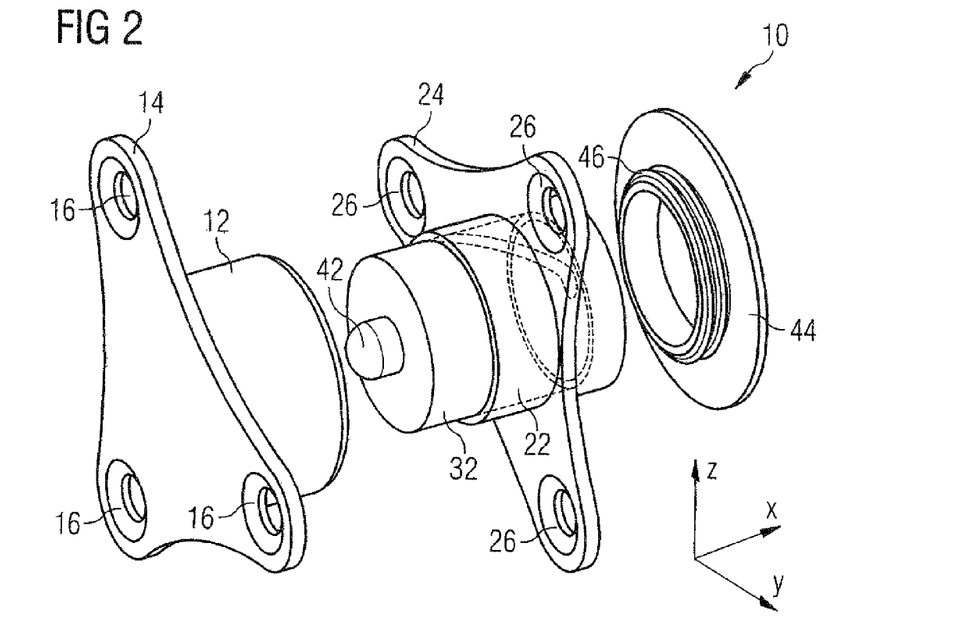
FIG. 2 shows a three-dimensional representation of the bearing device according to FIG. 1.
Figure 3:
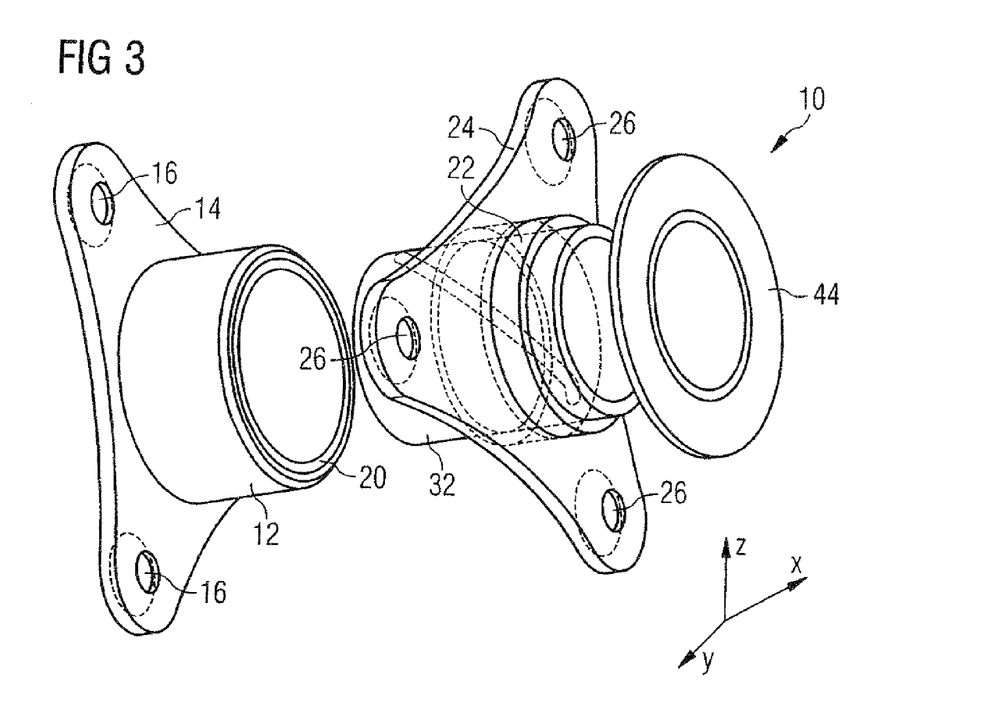
FIG. 3 shows a further three-dimensional representation of the bearing device according to FIG. 1.
Figure 4:
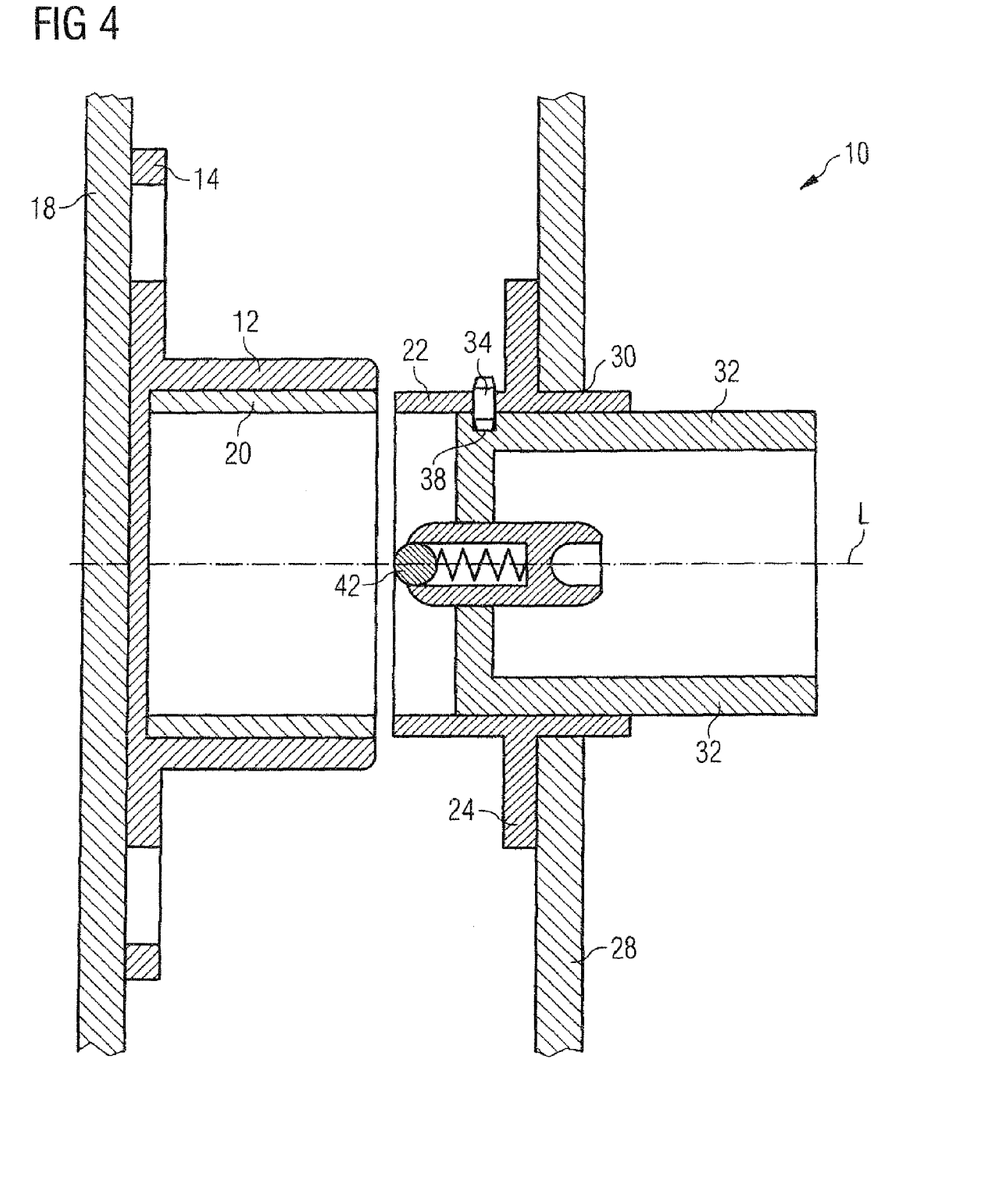
FIG. 4 shows a longitudinal sectional view of the bearing device according to FIG. 1, wherein a bearing bolt is located in a first position in a bearing bolt guide.
Figure 5:
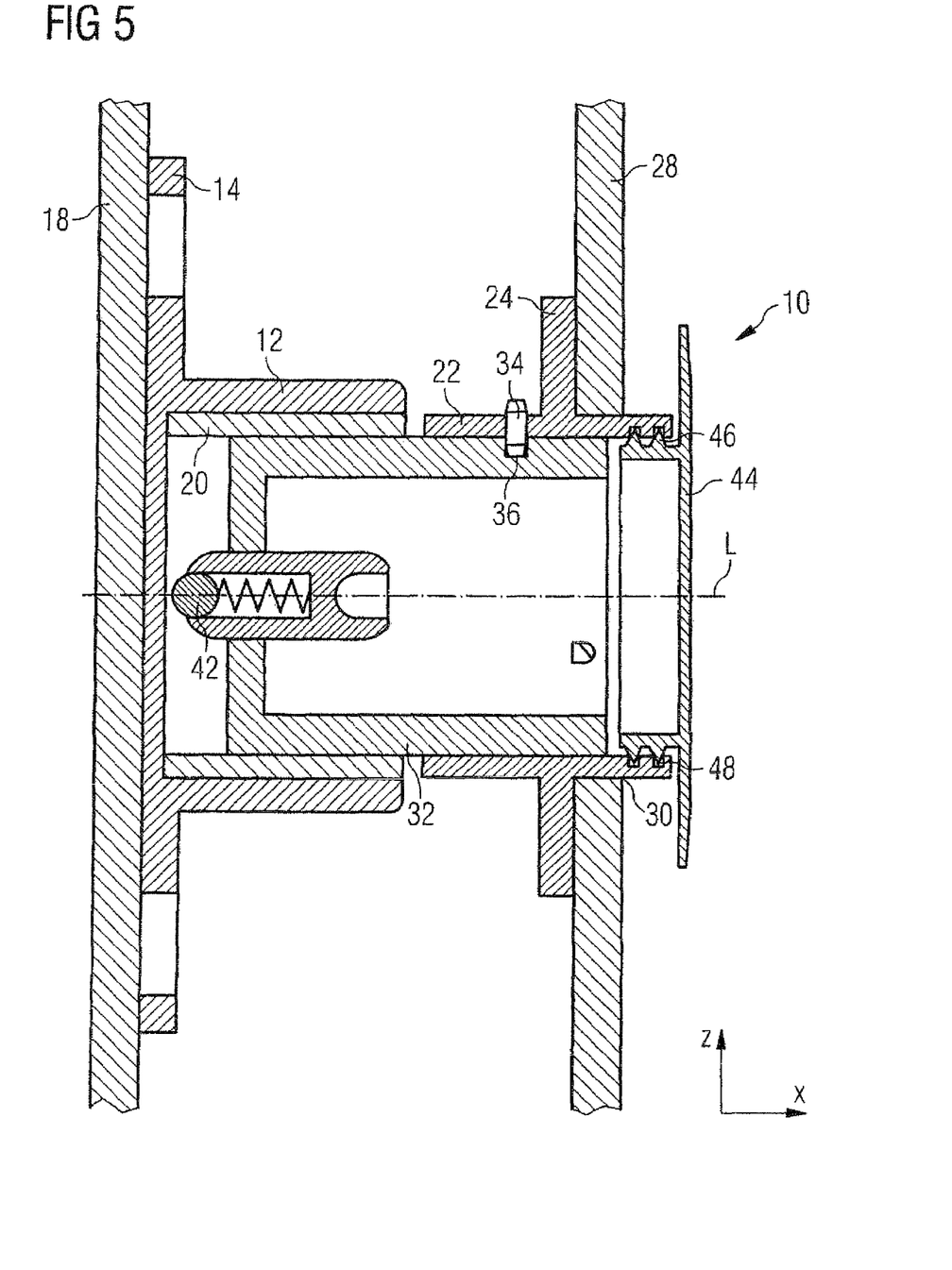
FIG. 5 shows a longitudinal sectional view of the bearing device according to FIG. 1, wherein the bearing bolt is located in a second position in the bearing bolt guide and is accommodated in a bearing bush.

The bearing device 10 also comprises a bearing bolt guide 22 of hollow cylindrical formation. The bearing bolt guide 22 is formed in one piece with a base plate 24 which extends radially outwards from an outer surface of the bearing bolt guide 22. Similarly to the bearing bush base plate 14, the bearing bolt guide base plate 24 is also provided with three bores 26 for accommodating three screws. As shown in FIGS. 4 and 5, the bearing bolt guide 22 is intended to be fastened to an outer surface of a side wall 28 of a lowerable luggage rack shell which faces the side wall 18 of the luggage rack housing when the luggage rack is in the finally assembled state. In order to fasten the bearing bolt guide base plate 24 and thus the bearing bolt guide 22 to the side wall 28 of the lowerable luggage rack shell, three screws are passed through the bores 26 formed in the bearing bolt guide base plate 24 and screwed into the side wall 28 of the lowerable luggage rack shell.

An opening 30 is formed in the side wall 28 of the lowerable luggage rack shell 28, through which opening a portion of the bearing bolt guide 22 is passed. The bearing bolt guide base plate 24 thus lies like a flange against a portion of the outer surface of the side wall 28 of the lowerable shell which surrounds the opening 30 formed in the side wall 28 of the lowerable shell.

A bearing bolt 32 is disposed in the bearing bolt guide 22 such that it is movable along a longitudinal axis L of the bearing bolt guide 22 between a first position (see FIG. 4) and a second position (see FIG. 5). When the bearing bolt 32 is located in its first position, as shown in FIG. 4, it projects through the opening 30 formed in the side wall 28 of the lowerable shell into an interior of the lowerable shell. In its first position the bearing bolt 32 allows the lowerable shell to be positioned relative to the luggage rack housing without obstruction. However when the bearing bolt 32 is located in its second position shown in FIG. 5, it projects in the direction of the bearing bush 12 out of the bearing bolt guide 22 and, if the lowerable luggage rack shell is appropriately positioned, can engage in the bearing bush 12 fastened to the housing side wall 18. The sliding bearing device 20 which is pressed into the bearing bush 12 enables the bearing bolt 32 to be rotatably borne in the bearing bush 12 with little friction.

A retaining device for retaining the bearing bolt 32 in its first as well as its second position comprises a retaining pin 34. When the bearing bolt 32 is located in its second position, the retaining pin 34 engages in a first recess 36 which is formed in a circumferential surface of the bearing bolt 32. On the other hand, when the bearing bolt 32 is located in its first position, the retaining pin 34 engages in a second recess 38 which is likewise formed in the circumferential surface of the bearing bolt 32. The bearing bolt 32 is securely held in its position in the bearing bolt guide 22 through the interaction of the retaining pin 34 with the first or the second recess 36, 38.

A slotted guide 40 is also formed in the circumferential surface of the bearing bolt 32 between the first recess 36 and the second recess 38. Similarly to the recesses 36, 38, the slotted guide 40 also interacts with the retaining pin 34, i.e. the retaining pin 34 is guided in the slotted guide 40 when the bearing bolt 32 moves between its first and its second position. As can be seen in particular in FIG. 1, the slotted guide 40 extends at an angle relative to a front face of the bearing bolt 32 over the circumferential surface of the bearing bolt 32 in such a way that the bearing bolt 32 is movable along the longitudinal axis L of the bearing bolt guide 22 between its first and its second position by rotating relative to the bearing bolt guide 22. A rotation of the bearing bolt 32 clockwise relative to the bearing bolt guide 22 causes the bearing bolt 32 to move along the longitudinal axis L of the bearing bolt guide 22 out of its second position into its first position. On the other hand, a rotation of the bearing bolt 32 counterclockwise relative to the bearing bolt guide 22 causes the bearing bolt 32 to move along the longitudinal axis L of the bearing bolt guide 22 out of its first position into its second position.

The slotted guide 40 is hook-shaped at the end (FIG. 1), so that the bearing bolt 32 must be rotated via a dead centre into its second position. In order to come out of its second position, the bearing bolt 32 must be moved in the direction of the base plate 14. This is only possible when the spring pressure piece 42 is rotated into the bearing bolt 32. Once the spring pressure piece 42 has been rotated so as to contact the base plate 14, the bearing bolt 32 cannot be released from its second position.

Furthermore, the bearing bolt 32 can be configured so that in its second position it establishes an electrical connection between the luggage rack housing and the luggage rack shell by way of the base plate 14, e.g. via a sliding contact. This can be used to supply electricity to the luggage rack shell, e.g. for lighting.

Therefore the slotted guide 40 with the retaining pin 34 forms not just a device for guiding the movement of the bearing bolt 32 in the bearing bolt guide 22, but also acts as an anti-loss mechanism which holds the bearing bolt 32 secure against loss in the bearing bolt guide 22.

A spring pressure piece 42 is screwed into a front face of the bearing bolt 32. A portion of the spring pressure piece 42 extends from the front face of the bearing bolt 32 in the direction of the bearing bush 12. When the bearing device 10 is in the assembled state which is shown in FIG. 5, the portion of the spring pressure piece 42 which extends from the front face of the bearing bolt 32 interacts with the bearing bush base plate 14. As can be seen in particular from FIG. 4, the bearing bolt 32 is of hollow cylindrical formation. A portion of the spring pressure piece 42 which projects into the hollow cylindrical bearing bolt 32 is therefore also accessible through the bearing bolt 32.

Finally, the bearing device 10 comprises a cover plate 44. The cover plate 44 has a locking device 46 which is of circular ring-shaped formation and is provided with a sawtooth profile. The locking device 46 is intended to interact with a complementary locking device 48 which is in the form of a groove and is formed at the bearing bolt guide 22. The cover plate 44 can be easily and quickly fastened to the bearing bolt guide 22 by means of the locking devices 46, 48.

When mounting a lowerable luggage rack shell in a luggage rack housing, the bearing bush 22 is firstly fastened by means of the bearing bush base plate 14 to the inner surface of the luggage rack housing side wall 18 which faces the lowerable luggage rack shell when the luggage rack is in the assembled state. The bearing bolt guide 22 is similarly fastened with the bearing bolt 32 accommodated in the bearing bolt guide 22 by means of the bearing bolt base plate 24 to the outer surface of the side wall 28 of the lowerable luggage rack shell which faces the luggage rack housing when the luggage rack is in the assembled state. The bearing bolt guide 22 is mounted on the side wall 28 of the lowerable shell by passing a portion of the bearing bolt guide 22 through the opening 30 which is formed in the side wall 28 of the lowerable shell.

The bearing bolt 32 is then moved in the bearing bolt 22 along the longitudinal axis L of the bearing bolt guide 22 into its first position shown in FIG. 4 by rotating the bearing bolt 32 clockwise relative to the bearing bolt guide 22. Here the movement of the bearing bolt 32 in the bearing bolt guide 22 is guided by the interaction of the retaining pin 34 with the slotted guide 40. The bearing bolt 32 is at the same time reliably prevented from falling out of the bearing bolt guide 22 by the interaction of the retaining pin 34 with the slotted guide 40. The bearing bolt 32 is retained in its first position through the interaction of the retaining pin 34 with the second recess 38. As long as the bearing bolt 32 is located in its first position, the lowerable luggage rack shell can be positioned in the luggage rack housing without obstruction.

When the lowerable luggage rack shell has reached the desired position in the luggage rack housing, the bearing bolt 32 is moved in the bearing bolt guide 22 along the longitudinal axis L of the bearing bolt guide 22 into its second position shown in FIG. 5 by rotating the bearing bolt 32 counterclockwise relative to the bearing bolt guide 22. The bearing bolt 32 is retained in its second position through the interaction of the retaining pin 34 with the first recess 36 and the spring pressure piece 42. When the bearing bolt 32 is located in its second position in the bearing bolt guide 22, the bearing bolt 32 is accommodated in the bearing bush 12 and provides a secure bearing arrangement for the lowerable shell in the luggage rack housing. Fine adjustment of the bearing arrangement of the lowerable shell in the luggage rack housing then takes place by adjusting the position of the spring pressure piece 42 accordingly. The spring pressure piece 42 is accessible from the interior of the lowerable luggage rack shell through the hollow cylindrical bearing bolt 32 for this adjustment step. Finally, the cover plate 44 is fastened to the part of the bearing bolt guide 32 which extends into the interior of the lowerable shell by means of the locking devices 46, 48 in order to ensure that the interior of the lowerable shell is visually attractive.

The invention claimed is:

1. An arrangement, comprising:
an aircraft interior fitting component,
a bearing component, and
a device for rotatably bearing the aircraft interior fitting component at the bearing component, the device comprising:
a bearing bush fastened to one of the aircraft interior fitting component or the bearing component;
a bearing bolt which is adapted to be rotatably accommodated in the bearing bush; and
a bearing bolt guide fastened to the other of the aircraft interior fitting component or the bearing component, wherein the bearing bolt is disposed in the bearing bolt guide such that it is movable along a longitudinal axis of the bearing bolt guide between a first and a second position and retainable in at least one position in the bearing bolt guide by a retaining device,
wherein the bearing bolt is disengaged from the bearing bush in the first position and is rotatably accommodated in the bearing bush in the second position, and
wherein in at least one of the first and second positions, the retaining device fixes the bearing bolt against further rotational and longitudinal movement relative to the bearing bolt guide and away from the other of the first and second positions.

2. The arrangement according to claim 1, wherein the bearing bush is connected to a base plate for fastening the bearing bush to the bearing component or to the aircraft interior fitting component.

3. The arrangement according to claim 1, wherein the bearing bush comprises a sliding bearing device which is pressed into the bearing bush.

4. The arrangement according to claim 1, wherein the bearing bolt guide is connected to a base plate for fastening the bearing bolt guide to the aircraft interior fitting component or to the bearing component.

5. The arrangement according to claim 1, wherein the retaining device comprises a retaining pin which interacts with a receptacle formed in the bearing bolt in order to retain the bearing bolt in the first or second position in the bearing bolt guide.

6. The arrangement according to claim 1, further comprising:
an anti-loss mechanism which is adapted to hold the bearing bolt secure against loss in the bearing bolt guide.

7. The arrangement according to claim 6, wherein the anti-loss mechanism comprises a slotted guide which is formed in a circumferential surface of the bearing bolt as well as a pin which is guided in the slotted guide.

8. The arrangement according to claim 1, wherein the bearing bolt comprises a spring pressure piece having a portion which extends from a front face of the bearing bolt.

9. The arrangement according to claim 1, further comprising:
a cover cap with a locking device which is adapted to interact with a complementary locking device provided at the bearing bolt guide in order to fasten the cover cap to the bearing bolt guide.

10. The arrangement according to claim 1, wherein the aircraft interior fitting component is a lowerable shell of a luggage rack, and the bearing component is a luggage rack housing.

11. The arrangement according to claim 1, wherein the retaining device fixes the bearing bolt against the further rotational and longitudinal movement in each of the first and second positions.

12. A method for mounting an aircraft interior fitting component, to a bearing component, the method comprising:
fastening a bearing bush to one of the bearing component or the aircraft interior fitting component,
fastening a bearing bolt guide to the other of the aircraft interior fitting component or the bearing component, wherein a bearing bolt, which is adapted to be rotatably accommodated in the bearing bush, is disposed in the bearing bolt guide such that it is movable along a longitudinal axis of the bearing bolt guide between a first and a second position,
moving the bearing bolt in the bearing bolt guide in a first direction along the longitudinal axis of the bearing bolt guide into the first position, in which the bearing bolt is disengaged from the bearing bush such that the aircraft interior fitting component is positionable relative to the bearing component as long as the bearing bolt is located in the first position, moving the bearing bolt in the bearing bolt guide in a direction which is opposite to the first direction along the longitudinal axis of the bearing bolt guide into the second position, in which the bearing bolt is rotatably accommodated in the bearing bush, and retaining the bearing bolt in at least one of the first and second positions with a retaining device by fixing the bearing bolt against further rotational and longitudinal movement relative to the bearing bolt guide and away from the other of the first and second positions.

13. The method according to claim 11, wherein the bearing bolt is retained with the retaining device against the further rotational and longitudinal movement in each of the first and second positions.

14. The method according to claim 12, wherein the movement of the bearing bolt between the first and the second position is guided by the interaction of a slotted guide made in a circumferential surface of the bearing bolt with a pin which is guided in the slotted guide, wherein the slotted guide is configured so that the guided movement of the bearing bolt along the longitudinal axis of the bearing bolt guide is brought about by rotating the bearing bolt relative to the bearing bolt guide.

15. The method according to claim 12, wherein fine adjustment of the arrangement of the aircraft interior fitting component at the bearing component takes place by adjusting a spring pressure piece having a portion which extends from a front face of the bearing bolt.

16. The method according to claim 12, wherein a locking device which is provided at a cover cap is interlocked with a complementary locking device which is provided at the bearing bolt guide in order to fasten the cover cap to the bearing bolt guide.

* * * * *